US009659192B1

United States Patent
Wanasek et al.

(10) Patent No.: US 9,659,192 B1
(45) Date of Patent: May 23, 2017

(54) SECURE DETERMINISTIC FABRIC SWITCH SYSTEM AND METHOD

(71) Applicant: Rockwell Collins, Inc., Cedar Rapids, IA (US)

(72) Inventors: Kevin A. Wanasek, Marion, IA (US); Brian S. Rach, Vinton, IA (US); Peter W. Jones, Cleburne, TX (US); Greg L. Shelton, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 105 days.

(21) Appl. No.: 14/849,987

(22) Filed: Sep. 10, 2015

(51) Int. Cl.
*G06F 21/81* (2013.01)
*H04L 29/06* (2006.01)

(52) U.S. Cl.
CPC ............ *G06F 21/81* (2013.01); *H04L 63/105* (2013.01)

(58) Field of Classification Search
CPC ................................. G06F 21/81; H04L 63/105
See application file for complete search history.

(56) References Cited

U.S. PATENT DOCUMENTS

| | | | | |
|---|---|---|---|---|
| 6,430,181 B1* | 8/2002 | Tuckey | ............... | H04L 12/5693 370/386 |
| 7,633,955 B1* | 12/2009 | Saraiya | ................. | H04L 49/356 370/395.31 |
| 8,880,868 B1* | 11/2014 | Shultz | ................. | H04L 63/0464 713/150 |
| 9,524,399 B1* | 12/2016 | Takahashi | ............... | G06F 21/78 |
| 2002/0101866 A1* | 8/2002 | Miloslavsky | ........ | G06Q 10/107 370/386 |
| 2004/0111605 A1* | 6/2004 | Weber | ................. | H04L 63/0823 713/152 |
| 2005/0108444 A1* | 5/2005 | Flauaus | ............... | H04L 12/2602 710/15 |
| 2005/0198254 A1* | 9/2005 | Frazier | ................. | H04L 49/357 709/224 |
| 2005/0198412 A1* | 9/2005 | Pedersen | ............. | H04L 63/0428 710/30 |
| 2006/0013133 A1* | 1/2006 | Peng | ................... | H04L 12/5695 370/230 |
| 2006/0136570 A1* | 6/2006 | Pandya | ............. | G06F 17/30985 709/217 |

(Continued)

*Primary Examiner* — Joseph P Hirl
*Assistant Examiner* — J. Brant Murphy
(74) *Attorney, Agent, or Firm* — Angel N. Gerdzhikov; Donna P. Suchy; Daniel M. Barbieri (57) ABSTRACT

A Secure Deterministic Fabric (SDF) switch architecture and design may provide a cost effective reconfigurable Multiple Single Levels (MSL) of Security implementation that is low risk to certify and may not require recertification after an initial certification evaluation. The SDF switch enables assignment of processing resources and attached payloads to a specific security level fabric for use by an operational system. The assignment of defined security levels is commanded by a SDF control and status module without changing certification, aircraft wiring, or revising hardware. The processing resources are statically assigned during power up on a per mission basis or dynamically reassigned between security levels during a mission as processing requirements may change as a result of mission stage. The SDF switch supports mission defined security configurations for individual security level operational payload processing.

20 Claims, 5 Drawing Sheets

(56) References Cited

U.S. PATENT DOCUMENTS

| | | | |
|---|---|---|---|
| 2006/0271706 A1* | 11/2006 | Dugan | H04L 29/12254 709/245 |
| 2007/0189196 A1* | 8/2007 | Miller | H04L 29/06027 370/315 |
| 2010/0115630 A1* | 5/2010 | Maire | H04L 63/0227 726/30 |
| 2010/0202236 A1* | 8/2010 | Kahler | G06F 11/1441 365/228 |
| 2011/0066851 A1* | 3/2011 | Bello | H04L 45/42 713/166 |
| 2011/0243329 A1* | 10/2011 | Staehly | H04K 1/00 380/256 |
| 2013/0136036 A1* | 5/2013 | Chen | H04W 28/24 370/260 |
| 2014/0119727 A1* | 5/2014 | Ousley | H04Q 11/0005 398/45 |
| 2014/0185611 A1* | 7/2014 | Lie | H04L 49/25 370/355 |

* cited by examiner

SECURE DETERMINISTIC FABRIC SWITCH SYSTEM AND METHOD

FIELD OF THE INVENTIVE CONCEPTS

Embodiments of the inventive concepts disclosed herein relate generally to varying levels of security classification of processing systems. More particularly, embodiments of the inventive concepts disclosed herein relate to a system and method for maintaining switched multiple independent levels of security within a single processing system.

BACKGROUND

Traditionally, secure computing platforms may exist under a single level of security causing an entire platform (e.g., aircraft, ground vehicle, or other) to become designated at the highest security level. This becomes problematic for several reasons for both missions and operations. For example, a military aircraft supporting radios for both military datalink (e.g., LINK 16) and civil communications may have systems purely designed for civil communications. However, since the civil communications systems are installed on the military aircraft, the civil systems are classified at the same level of security as the onboard military sensitive systems.

Also, an exemplary aircraft configured with an upgraded sensor either defined as 1) a different level of security as the remaining onboard systems or 2) is required to change security levels based on mission profile may be required to remain at the highest level of security classification of the upgraded sensor. Further, an aircraft designated at top secret security level may require all personnel servicing the aircraft to have a top secret security clearance.

Isolation of the levels of security may be one requirement of a certification entity. For example, an onboard sensor may be classified as a top secret component of hardware, whereas a fuel system monitor may remain unclassified. Each of these systems must remain isolated from the other in order to be certified for simultaneous use. However, both systems use similar processing resources to accomplish their individual task. Traditionally, Multiple Independent Levels of Security requires dedicated equipment, wiring, and growth provisions to maintain physical security separation.

A data guard (e. g., Data Diode) may be employed to enable data to traverse security levels by restricting unintentional data migration from one security level to another. These data guards may be limited by bandwidth and require additional processing resources to properly function.

Traditionally, in order to move processing capability from a first security level to a second security level, an operator may have been required to physically move the processing resource (blade) and associated software from a first location in a processing unit to a second location or physically separate processing unit. This cumbersome physical movement of processing resources requires increased labor and time to accomplish the mission and is often logistically unfeasible.

A more accepted approach is to move software to reserve processing elements in the newly designated security level and rewiring the platform to reassign associated payloads. This fixed association of processing power to security level required redundant elements to be installed on the platform and also increased weight and cost associated to growth provisions for processing elements that are unused during certain operations. Also, in order for equipment to be certified for use on a platform with physical separation of security levels, two (or more) sets of wires may be installed on the platform from the processing board to a remote station to physically connect with the operational hardware (e.g., a wing pylon mounted operational sensor). The additional wiring increases weight of the platform, and causes additional maintenance when one or more of the wires must be replaced.

Recent architecture for implementing Multiple Levels of Security (MLS) has taken the approach of segregating security levels to separate cores inside a single multi-core central processing unit (CPU). This approach may be referred to as MLS on a single device. This approach reduces redundancy of individual entire systems devoted to a single task and security level. While there are applications such as the above mentioned data guards that sometimes may function within the MLS architecture on a single device, this MLS approach carries certification risk, requires an expensive Operating System (OS), and often locks the certification to a specific non-reconfigurable implementation. Even minor changes to the software or hardware may potently impact a previous certification and may also incur significant expense to recertify.

With differing mission requirements, a platform may be required to use a specific (e.g., top secret) sensor during one mission and a differently classed (e.g., secret) sensor during a second mission. With operating systems and processing resources permanently tasked to a specific sensor, processing power may be inefficiently deployed.

Cluster computing has traditionally been accomplished by interconnecting processing resources (elements) over Ethernet and peripherals have been dedicated to a processing resource by Peripheral Component Interconnect (PCI) bus. However, the PCI framework may limit bandwidth where it may be most needed: for immediate processing power available for a current task.

Therefore a need remains for a system architecture and apparatus offering reconfigurable multiple single levels of security (MSL) within a single platform assigning a user defined security level to both a processing resource and attached payload on device power-up. A desirable system may offer immediate processing resources available to a variety of security classifications of the mission and task without changing certification, aircraft wiring, revising hardware, and without the potential excess resources of a static implementation.

SUMMARY

One embodiment of the inventive concepts disclosed herein is directed to a system for secure deterministic fabric switching. The system may comprise a secure deterministic fabric (SDF) switch element connectable with a Remote Interface Unit (RIU) and connectable with a general purpose processor (GPP). The system may include a first security level fabric, and at least one additional second security level fabric, the SDF switch element configured for operationally coupling a RIU with one of the first security level fabric or the second security level fabric. Here, the SDF switch element may be further configured for operationally coupling a GPP with one of the first security level fabric or the second security level fabric.

The system may include a SDF status and control module including, 1) a control element coupled with each of the SDF switch element and configured for commanding a position of each of the SDF switch element, 2) a status monitor coupled with each of the SDF switch element and configured for monitoring a status of each of the SDF switch element, and 3) a power enable (PE) control system coupled with the RIU and the GPP and configured for supplying and removing power from the RIU and the GPP. The SDF status and control module may be configured for receiving a SDF configuration profile from a trusted GPP, the SDF configuration profile including a SDF switch element configuration.

The SDF status and control module may be further configured for controlling the control element, the status monitor and the PE control system. This control may include commanding the position of the SDF switch element in compliance with the SDF switch element configuration, sampling a status of each of the SDF switch element, and determining via the status monitor if the status of each one of the SDF switch element is in compliance with the SDF switch element configuration. The SDF status and control module may also apply power via the PE control system to a specific one of the RIU and the GPP if the status associated with a SDF switch element coupled with the specific one of the RIU and the GPP is in compliance, and remove power via the PE control system from a specific one of the RIU and from a specific one of the GPP if the status associated with a SDF switch element coupled with the specific one of the RIU and the GPP is not in compliance.

In one embodiment, the RIU may be defined as an additional system requiring or requesting additional processing capability via switchable connectivity to one or more of the GPP.

An additional embodiment of the inventive concepts disclosed herein may include a system wherein the SDF switch element further comprises a first switch element comprising at least two positions coupled with a second switch element comprising an on/off switch, the first switch element further including a common switch position.

An additional embodiment of the inventive concepts disclosed herein may include a system wherein the first security level fabric is restricted to an unclassified level of security and the second security level fabric is restricted to one of: a secret level of security, a top secret level of security, a sensitive but unclassified level of security, and a secret no foreign level of security.

An additional embodiment of the inventive concepts disclosed herein may include a system wherein the trusted one of the GPP is restricted to a highest security level available to each of the GPP.

An additional embodiment of the inventive concepts disclosed herein may include a system wherein commanding a position of the SDF switch element further comprises a SDF switch element command prior to a GPP power cycle and a constant SDF switch element position during the power cycle.

An additional embodiment of the inventive concepts disclosed herein may include a system wherein commanding a position of the SDF switch element further comprises a dynamic repurposing of a GPP, the dynamic repurposing including a dynamic SDF switch element command in response to a change in RIU requirements. The dynamic SDF switch element command causing the SDF status and control module to perform and direct a plurality of steps. One step may include selecting a GPP for dynamic repurposing and removing power via the PE control system from the selected GPP.

An additional step may include commanding via the control element the position of the SDF switch element coupled with the selected GPP, the commanding in compliance with the dynamic SDF switch element command and sampling via the status monitor the status of each of the SDF switch element. An additional step may include determining via the status monitor if the status of each one of the SDF switch element is in compliance with the dynamic SDF switch element command and applying power via the PE control system to the selected GPP if the status associated with the SDF switch element coupled with the selected GPP is in compliance with the dynamic SDF switch element command.

An additional embodiment of the inventive concepts disclosed herein may include a system wherein the SDF switch element configuration is limited by a specific number of switch element configurations, a time of implementation of the switch element configuration, a duration of a mission, and may include a prohibited SDF switch element configuration.

An additional embodiment of the inventive concepts disclosed herein may include a system wherein the status monitor further includes at least two additional status monitoring elements to provide a triple redundancy to the monitoring function of each of the SDF switch element.

An additional embodiment of the inventive concepts disclosed herein may include a system wherein the SDF status and control module is a field programmable gate array which is configurable by the trusted one of the GPP.

An additional embodiment of the inventive concepts disclosed herein may include a system wherein each of the SDF switch elements is couplable to a GPP and a RIU via a peripheral component interface express architecture.

An additional embodiment of the inventive concepts disclosed herein is directed to a method for secure deterministic fabric switching. The method may comprise applying power to a trusted general purpose processor (GPP), the trusted GPP one of a plurality of GPP. The method may include enabling an operational fabric configuration code within the trusted GPP and transferring a secure deterministic fabric (SDF) configuration profile from the trusted GPP to a SDF status and control module, the SDF configuration profile based on the operational fabric configuration code.

The method may include commanding, via a control element associated with the SDF status and control module, a position of a SDF switch element in compliance with the SDF configuration profile, the position of the SDF switch element coupling the plurality of GPP and a remote processing element (e.g., a RIU) with one of a first security level fabric or a second security level fabric. The method may sample, via a status monitor associated with the SDF status and control module, a status of each of the SDF switch element and determine via the status monitor if the status of each one of the SDF switch element is in compliance with the SDF configuration profile.

If in compliance, the method may apply power, via a power enable (PE) control system associated with the SDF status and control module, to a specific one of the remote element and a specific one of the GPP if the status associated with a SDF switch element coupled with the specific one of the remote element and the specific one GPP is in compliance with the SDF configuration profile. If not in compliance or if the status may fall out of compliance, the method may remove power via the PE control system from a specific one of the remote element and a specific one of the GPP if the status associated with a SDF switch element coupled with the specific one of the RIU and the specific one GPP is not in compliance with the SDF configuration profile.

An additional embodiment of the inventive concepts disclosed herein may include a method wherein the RIU is one of: a remote interface unit associated with a weapons station, an additional processing resource requiring GPP processing capability, and a switched Ethernet system.

It is to be understood that both the foregoing general description and the following detailed description are exemplary and explanatory only and are not necessarily restrictive of the inventive concepts as claimed. The accompanying drawings, which are incorporated in and constitute a part of the specification, illustrate embodiments of the inventive concepts and together with the general description, serve to explain the principles of the inventive concepts disclosed herein.

BRIEF DESCRIPTION OF THE DRAWINGS

The numerous advantages of the inventive concepts disclosed herein may be better understood by those skilled in the art by reference to the accompanying figures in which.

DETAILED DESCRIPTION

Reference will now be made in detail to the presently preferred embodiments of the inventive concepts, examples of which are illustrated in the accompanying drawings. The following description presents certain specific embodiments of the inventive concepts disclosed herein. However, the inventive concepts disclosed herein may be embodied in a multitude of different ways as defined and covered by the claims. In this description, reference is made to the drawings wherein like parts are designated with like numerals throughout.

Embodiments of the inventive concepts disclosed herein are directed to a Secure Deterministic Fabric (SDF) Switch architecture and design which may provide a cost effective reconfigurable multiple single levels of security implementation that is low risk to certify and recertify after an evolution in hardware or software. Embodiments of the SDF switch described herein may enable processing resources in an integrated processing cabinet (IPC) or other line replaceable unit (LRU) and Weapons Replacement Assembly (WRA) to be assigned on power-up to user defined security levels without changing certification, aircraft wiring, or revising hardware. Embodiments of the inventive concepts disclosed herein may enable flexibility to re-align computational power between security levels as processor requirements may periodically evolve. In addition, embodiments of the inventive concepts disclosed herein may support mission defined security configurations for individual security level processing and processing of sensor payloads.

Embodiments of the inventive concepts disclosed herein may directly apply to various cross domain arrangements to segregate hardware within a security level including multiple independent levels of security (MILS) and virtual hosting of multiple levels of security (MLS) on a single core or multi-core processor. The system 100 may not preclude the use of additional architectures including data guards and additional components associated with the overall system and configuration.

Embodiments of the inventive concepts disclosed herein may include a method and implementation(s) of configurable processing enclaves for a multilevel security platform. Configuration of enclaves may be achieved by A-BC switching endpoint elements on, for example, a peripheral component interconnect express (PCIe) interconnect architecture. By controlling which PCIe endpoints are visible to root complexes, the system and method may construct security enclaves and later redefined without changing hardware or platform wiring connections to a line replaceable unit (LRU)/line replaceable module (LRM) chassis.

In embodiments, a PCIe endpoint may be a general processing unit, IO card, graphics engine etc. Endpoints may be internal or if connected by fiber optics, external to the chassis that houses the root complex. The implementation approaches can also support switching of Ethernet fabric.

Embodiments of the inventive concepts disclosed herein may be implemented on a plurality of systems. As used herein, an aircraft may be one exemplary platform specifically suitable for one implementation of the inventive concepts disclosed herein. However, additional implementations and platforms may find direct benefit from specific embodiments to enable the concepts to perform and directly apply therein.

| Reference Chart | |
|---|---|
| Ref. No. | Description |
| 100 | System |
| 110 | SDF Switch |
| 112 | GPP SDF switch elements |
| 114 | SDF Status and Control |
| 116 | RIU SDF switch elements |
| 118 | Configuration Element |
| 120 | Sensitive But Unclassified (SBU) COTS Fabric |
| 122 | Secret (S) COTS Fabric |
| 124 | Top Secret (TS) COTS Fabric |
| 126 | Power Enable Bus |
| 128 | Control Bus |
| 130 | TS General Purpose Processor (GPP) |
| 132 | First GPP |
| 134 | S GPP |
| 136 | SBU GPP |
| 138 | Second GPP |
| 140 | Power Enable |
| 150 | Power Source |
| 162 | First Remote Interface Unit (RIU) |
| 164 | Second RIU |
| 166 | Third RIU |
| 220 | A B C Switch |
| 224 | First SDF Status Monitor |
| 230 | On/Off Switch |
| 232 | Associated Element |
| 234 | Second SDF Status Monitor |
| 266 | Switchable Processing Resource |
| 320 | First Physical Switch |
| 322 | Second Physical Switch |
| 324 | Quad Equalizer & Pre-emphasis Driver w/Serial Status & Control Interface |
| 330 | Terminators |
| 342 | First Command Bus |
| 344 | Second Command Bus |
| 346 | Quad Control Bus |
| 500 | Aircraft Implementation |
| 510 | Aircraft |
| 520 | TS Sensor |
| 530 | SBU Fuel Tank |

Figure 1:
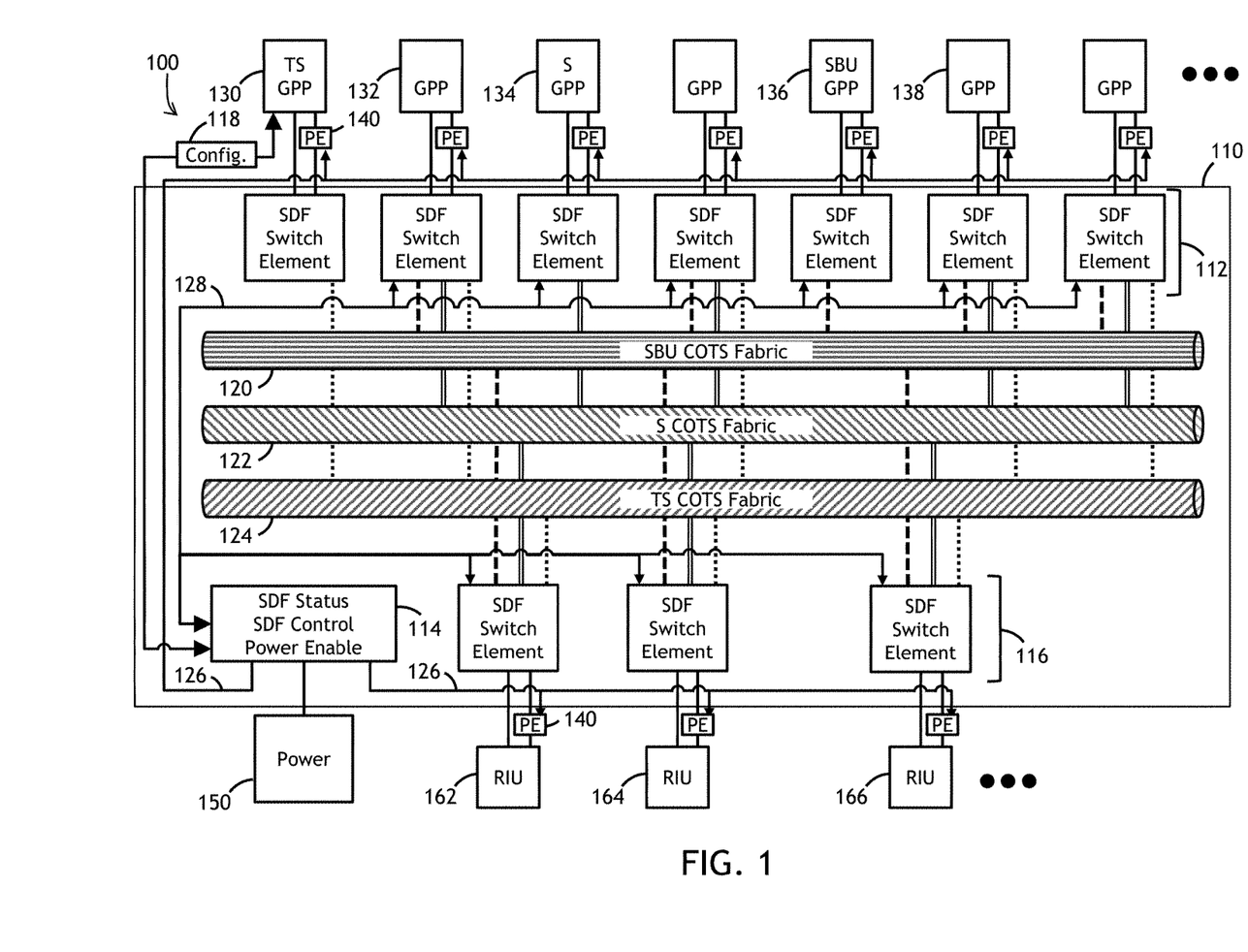
FIG. 1 is a diagram of a multi-enclave security level fabric architecture in accordance with an embodiment of the inventive concepts disclosed herein.

Referring to FIG. 1, a diagram of a multi-enclave security level fabric architecture in accordance with an embodiment of the inventive concepts disclosed herein is shown. System 100 may operate to connect a plurality of remote interface units (RIU) 162-166 with a plurality of general purpose processors (GPP) 130-138 via one of the commercial off the shelf (COTS) fabrics; a sensitive but unclassified (SBU) COTS fabric 120, a secret (S) COTS fabric 122 and a top secret (TS) COTS fabric 124. Onboard a platform, a secure deterministic fabric (SDF) switch 110 may function to make the secure connection to accurately partition each of the levels of security from the other.

The SDF switch 110 may include a plurality of RIU SDF switch elements 116, one assigned to each RIU 162-166 in the architecture as well as a plurality of GPP SDF switch elements 112, one assigned to each of the GPP 130-138 in the architecture. A power supply 150 may provide power to the SDF switch 110 as well as to a SDF status and control 114.

The system 100 may include a configuration element 118 to interface between the trusted TS GPP 130 (e.g., highest onboard security level processor) and the SDF status and control 114 via a control bus 128 to provide initial control and instruction to the SDF status and control 114 for initial SDF switch 110 configuration. The control bus 128 may operate to blindly control and monitor each of the SDF switch elements 112 and 116 without access to the content of the data transferred via one of the fabrics 120, 122 and 124. The SDF status and control 114 may be implemented in a plurality of hardware options with a preferable hardware option as a field programmable gate array (FPGA) configured for controlling the status of each of the SDF switch elements 112 and 116.

Individual GPP including a TS GPP 130, a first GPP 132, a S GPP 134, a SBU GPP 136, and a second GPP 138 may provide processing power available to each of the RIUs onboard the platform. Individual RIUs including a first RIU 162, a second RIU 164 and a third RIU 166 may perform an assigned mission onboard the platform and required processing power of the plurality of GPP to execute the mission. Each RIU may act as a data concentrator to connect the processing resource GPPs with an operational store loaded on the platform. For example, a 1553 bus, serial bus and Ethernet bus may be some examples of operational busses and connected systems connectable by the system 100. In one example, a physically separate network may be connectable to the system 100 via a RIU 162 wherein as the SDF switch may change, each connected element also switches to the newly connected security level. For example, one RIU may be installed on a wing station pylon easily connectable with an operational store loaded on the wing station.

A power enable element 140 may provide the ability for the GPP 130 to connect to the desired COTS fabric 120, 122 and 124 only after the SDF switch elements 112 and 116 are in the correct position. System 100 may employ SDF status and control 114 to control each power enable 140 to power and depower each GPP 130-138 as required.

As used herein, an enclave may be defined as a connection of hardware assets aligned to accomplish a task. For example, a sensor connected to a processor to accomplish the sensor task may be considered one enclave of hardware connected to perform the task. The system 100 may include multi enclave security level fabric architecture to connect each RIU with one or more available GPP to accomplish the task of the RIU.

Also as used herein, a fabric may be defined as a combination of hardware and related software tasked with moving data through a network from a network entry node to a correct exit network node. In embodiments, the COTS fabrics 120, 122 and 124 may include one or more of Ethernet elements, PCIe element, PCIexpress-based fabric elements, InfiniBand elements, and the like to complete the connection between the various elements of the system 100.

System 100 may include the three or more COTS fabric elements which reflect a separate fabric enclave and level of security within the SDF switch 110. The SBU COTS fabric 120 may carry the data classified as SBU while the S COTS fabric 122 may operate to carry data classified as S and the TS COTS fabric 124 may operate to carry data classified TS.

In operation, as each RIU 162 may require one of the COTS fabric infrastructures to complete its assigned task, the SDF status and control 114 may assign one or more of the GPPs to the RIU to perform the task. For example, a TS tasked performed by a TS sensor attached to RIU 162 may require the performance of the TS GPP 130 as well as the first GPP 132 and the second GPP 138 being assigned to the first RIU 162.

Since certification of the SDF switch 110 may be one goal, the system 100 may employ simple yet effective elements to 1) accomplish the reassignment of the RIU 162 with the desired processing elements and 2) reassign each GPP 130-138 to an RIU in compliance with standard certification requirements of a potential operator. In this manner, the system 100 may offer a certifiable system capable of reassigning processing resources to the desired RIU to accomplish the mission.

A SDF status and control 114 may limit a number of configurations system 100 may employ in operation and also delineate prohibited configurations. In one embodiment, a limited number (e.g., 15) of possible configurations may be housed with a non-volatile memory within configuration element 118 and include possible connection scenarios the system 100 may employ. For example, in one possible configuration, the TS GPP 130 is always connected with the TS COTS fabric 124 while the SBU GPP 136 may be always connected with the SBU COTS fabric 120. Also, to simplify a certification process, a matrix of possible connections including SDF switch element 112 and 116 positions may ensure the matrix of possible connections is not only a possible matrix but also a limiting matrix of allowable connections.

The SDF status and control 114 may also list prohibited configurations in a similar non-volatile memory matrix within configuration element 118 and include a listing of the prohibited connections. For example, the TS GPP 130 may be prohibited from connecting with the SBU COTS fabric 120 as well as the S COTS fabric 122. In this manner, the system 100 may provide a security guarantee to an operator that TS information will not be transferred via any other fabric than the TS COTS fabric 124.

The SDF status and control 114 may also operate to periodically monitor the status of each of the SDF switch elements 112 and 116 to ensure each switch element is in the correct position according to the possible configuration matrix and the prohibited configuration matrix. System 100 may employ a double and/or triple redundancy to ensure each of the SDF switch elements 112 and 116 is in the correct position to connect the correct element (RIU and GPP) to the correct COTS fabric (TS, S and SBU). The monitor within SDF status and control 114 may periodically query each of the SDF switch elements to ensure correct switch position and also compliance with each of the prohibited and possible configurations.

The system 100 may adjust the amount of processing capability for the platform from one mission to the next. For example, a first mission may include a strike capability, a second may include a reconnaissance capability while a third may include intelligence gathering. Each separate mission may require separate GPP 130-138 processing power applied to specific peripherals attached to each one of the RIUs 162-166 for completion of each mission.

Embodiments of the inventive concepts disclosed herein may also dynamically reassign GPPs to RIUs within the same COTS fabric or to a different COTS fabric should a need arise during a mission. For example, should a platform launch on a reconnaissance mission and be re-tasked to a strike mission, the system 100 may dynamically repurpose processing elements (GPPs) from the TS COTS fabric 124 to the S COTS fabric 122 and vice versa via a command from the pilot. In this manner, the configuration element 118 may provide the reallocation instructions to the SDF status and control 114 to position the SDF switch elements 112 and 116 to repurpose the GPPs 130-138 to support the RIUs 162-166 employed during the strike mission.

Each repurpose event may involve the SDF status and control 114 sending a command to the repurposed GPP to power down thereby removing all content from an associated random access memory (RAM) to accurately isolate each separate fabric 120, 122 and 124 and prepare the repurposed GPP for its new tasking on the same or different security level of COTS fabric. In one embodiment, the system 100 may employ a field-effect transistor (FET) to accomplish the power on and power off tasks associated with the GPP. In this manner, the FET may receive the commands from the SDF status and control 114 and operate to apply or remove power from the GPP.

In embodiments, the TS GPP 130 may function as a system level manager of the enclave configuration both on initial power up and dynamically as mission requirements may change. In one embodiment, the TS GPP 130 may load an OFP for a desired mission via, for example, a data card carried to the platform and loaded by a crewmember. Once the OFP is loaded, the system 100 may then receive the enclave configuration data necessary to control the SDF status and control 114 to position each of the SDF switch elements 112 and 116 in the proper position for the desired mission processing requirements.

System 100 may also scale from a single RIU 162 with a plurality of GPPs 130-138 from which to choose to multiple RIUs 162-166 attachable to multiple GPPs 130-138 via one of the COTS fabric 120, 122 and 124.

In one embodiment, the system 100 may, on power up, employ a physical discrete strapping technique to respond to an external input to command to which of the COTS fabrics 120, 12 or 124 it will connect with one of the RIUs 162-164 and one or more of the GPPs 130-138.

Embodiments of the system 100 may reconfigure the COTS fabric to adjust for varying mission requirements. In this manner, the SDF switch 110 may enable more processing resources available to the current mission while reducing a number of required onboard processors. Also, the SDF switch 110 may enable design considerations supporting security certification wherein the MLS architecture may accurately isolate each level of security from the other. In addition, the system 100 may provide procedural methods for Operational Flight Program (OFP) based fabric configuration to comply with the MLS incorporated within the each certification requirement.

In one embodiment, the system 100 may include an electro-optical module transmitter and receiver element situated preferably between a plurality of RIU 162 and RIU 164 and the RIU GPP SDF switch elements 116. In this manner, the GPPs 130-138 may process information from the plurality of RIUs as if the information originated from a single RIU. This configuration may simplify GPP requirements, increase overall performance of the GPPs and lower overall cost of development and implementation.

In one embodiment, the system 100 may comprise a system having the size, weight and power of a single operating system, yet able to offer the processing power of a plurality of individually partitioned systems. The embodiment may also employ low cost non-complex hardware to provide a simple yet effective architecture solution for certification.

The system 100 may support open systems initiatives by decoupling MSL security enforcement from commercial off the shelf (COTS) processing hardware. This separation of security enforcement may enable upgrading processing resources without disrupting certification. The SDF switch 110 may provide hardware enforcement of security enclaves for COTS processing resources and applications residing therein. This is accomplished through a combination of non-complex hardware with a favorable size weight power and cost (SWAP-C) and certification approach for full speed security isolated MSL networking and processing.

The system 100 may command a reconfigurable security fabric configured to rapidly meet the evolving needs of the operator. In addition, an operator may realize a significant product line reuse as enclave fabric may be tailored for operator specific applications either by factory configured firmware or dynamically allocated on power up by the OFP without need of recertification. Preferably, the system 100 may allow changing operator needs and an adaptable solution without significant certification, Non-Recurring Engineering (NRE), or requalification costs after the system is initially deployed.

Figure 2:
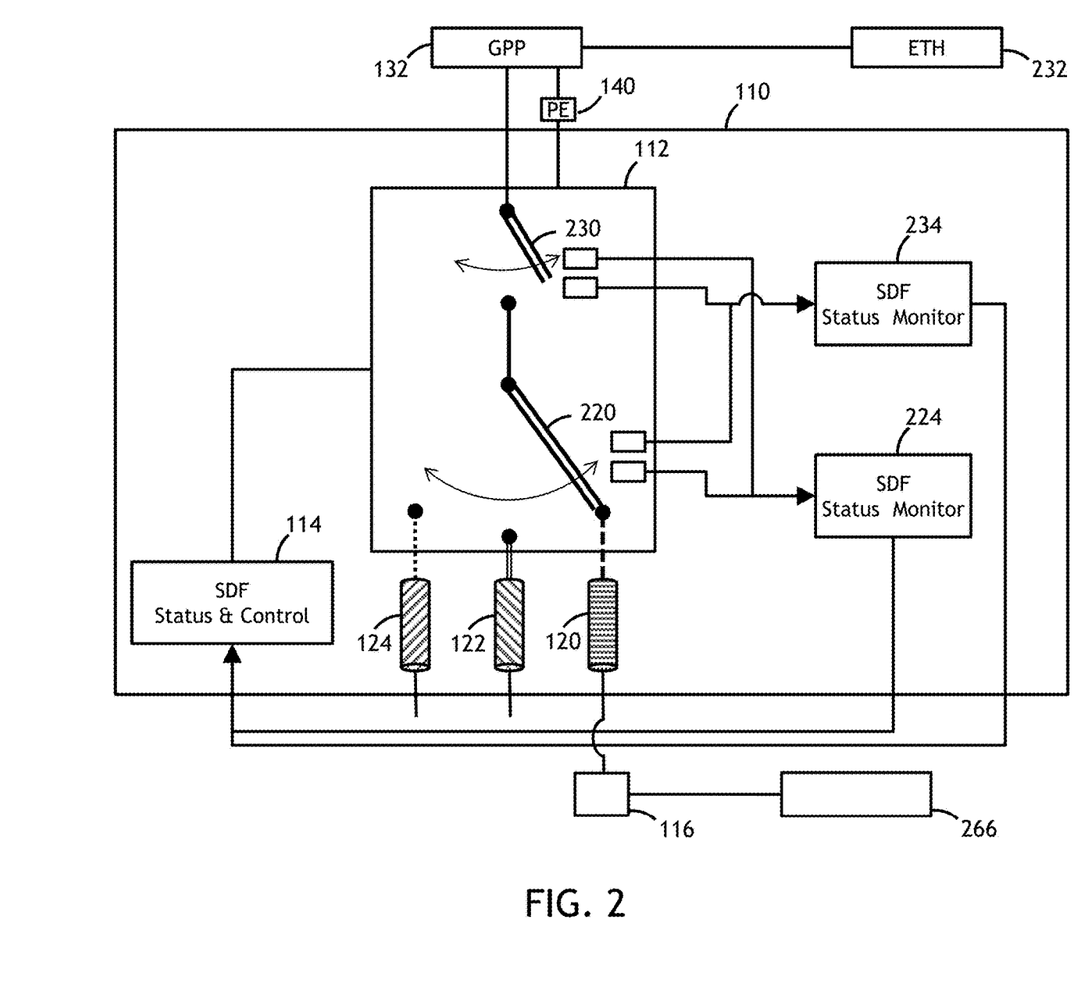
FIG. 2 is a diagram of a basic SDF switch in accordance with an embodiment of the inventive concepts disclosed herein.

Referring to FIG. 2, a diagram of a basic SDF switch in accordance with an embodiment of the inventive concepts disclosed herein is shown. A simplified SDF switch 110 including a plurality of SDF switch elements 112 and 116 may provide an ability to switch between each of the COTS fabrics 120, 122, and 124 to connect each RIU to one or more GPP. For exemplary purposes, the simplified model shown in FIG. 2 may indicate a simplified A B C switch 220 and a simplified on/off power switch 230.

In one embodiment, each SDF switch element 112 and 116 may be described as a hardware A B C switch 220 make/break element allowing a RIU 162 to be attached to only one COTS fabric enclave 120, 122 and 124 at a time. Any peripheral or Ethernet node attached to the RIU is then assigned to the same COTS fabric enclave 120 122 124 as the RIU 162 and moves with the RIU 162.

The SDF status and control 114 may operate not only to initially position each SDF switch element 112 and 116 into an initial position before the system 100 applies power to each of the GPP 132 but the SDF system and control 114 may also provide a monitoring capability for a first check of the activity of each of the SDF switch elements 112 and 116. The SDF switch 110 may further include a first SDF status monitor 224 and a second SDF status monitor 234 to redundantly monitor the status of each of the SDF switch elements 112 and 116. Here, the first and second SDF status monitors 224 and 234 may provide a second and third check of the SDF switch elements 112 and 116 activity to provide a triple redundancy of the status of each SDF switch element.

In addition, the system 100 may provide expansion capabilities via additional SDF switches 110 and additional GPPs 130-138 and RIUs 162-166 configured for expansion without the requirement for additional certification.

As a further monitor of the SDF switch 110 position, the system 100 may also employ each processing element including each GPP 130-138 to actively monitor the status of the SDF switch elements 112 and 116 to ensure the fabric is within its assigned boundaries. This GPP based monitoring may be in addition to the first and second SDF status monitors 224 and 234 or as a replacement thereof. For example, as a replacement monitor, should second GPP 138 be actively employed and connected to the TS COTS fabric 124, the second GPP 138 may be programmed at power up to actively monitor the connection established from the second GPP 138 to the COTS 124 to, for example, the second RIU 164.

Should one or more of the monitors determine an anomaly with the commanded position of each SDF switch element 112 and 116 verses an actual status of each of the SDF switch elements, The system 100 may alert the operator via an alert and a power down of the GPP and RIUs associated with the anomalous SDF switch elements 112 and 116 and a disconnect of each of the SDF switch elements 112 and 116 to preemptively keep each of the COTS fabrics 120, 122 and 124 accurately partitioned.

None of the SDF switch elements 112 and 116 include any form of memory. Unlike the traditional data guard that may have access to each level of data it may transmit, the SDF switch elements 112 and 116 retain zero information concerning a content of the data transmitted through. Again, simple certification being a goal of the system 100, the SDF switch elements 112 and 116 may assist in the simplistic design to promote certification.

Embodiments of the inventive concepts disclosed herein may operate without the requirement of an RIU. In some embodiments, a direct connection from the RIU SDF switch elements 116 to an additional switchable processing resource 266 (e.g., a PCIe connection to an additional IPC) and a fiber optic connection to a switched Ethernet system may function to isolate each level of security within its own fabric. In this manner, the system 100 may enable entire switchable systems to function within the desired COTS fabric yet remain securely isolated from the other COTS fabrics.

In addition, the system 100 may operate to shift any associated element 232 (e.g., Ethernet) associated with the switched GPP to the desired COTS fabric.

Figure 3:
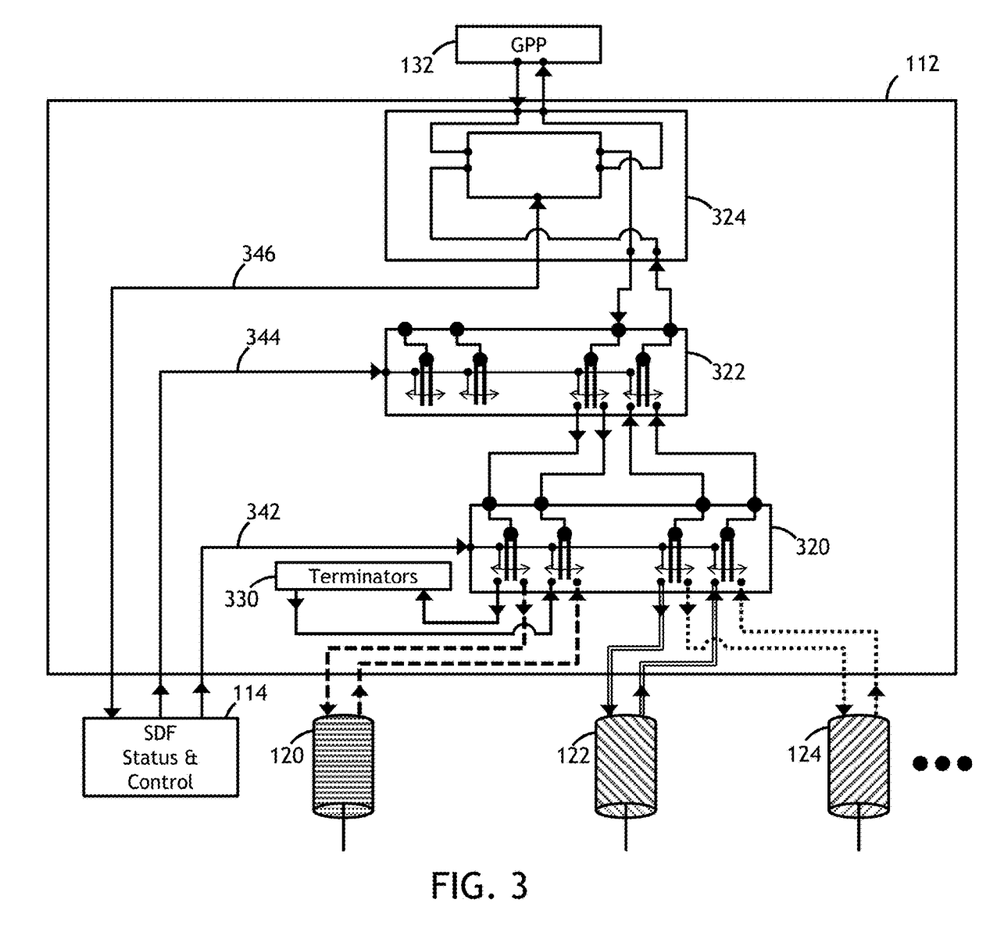
FIG. 3 is a detailed diagram of a SDF switch element exemplary of an embodiment of the inventive concepts disclosed herein.

Referring to FIG. 3, a detailed diagram of a SDF switch element exemplary of an embodiment of the inventive concepts disclosed herein is shown. The system 100 may employ a first physical switch 320 and a second physical switch 322 to operate to create the fabric to connect the GPP elements with the RIU elements via the commanded COTS fabric. Each physical switch is commanded via a control element coupled with each SDF switch element 112 and 116. Here the SDF status and control 114 control element may command a position of each of the first physical switch 320 via a first control bus 342 and the second physical switch 322 via a second control bus 344.

In embodiments, each of the first and second physical switch 320 and 322 may include a low voltage SDF switch element configured for switching PCIe, Thin Pipe Ethernet, optical and ultra-thin pipe Ethernet to create reconfigurable fabric enclaves. Each SDF switch element 112 and 116 may be comprised of a make/break element and one or more high speed Low Voltage Differential Signal Switches (LVDS).

Terminators 330 may operate to as one path option available to the first physical switch 320. Should the SDF status and control 114 command the first physical switch to this position, the terminators 330 may function to terminate the received signal.

A quad equalizer and pre-emphasis driver w/serial status and control interface 324 may operate between the second physical switch 322 and the first GPP 132. The quad equalizer 324 may serve two purposes: 1) to provide a strong certification story by providing an additional make/break function beyond powering down input ports of the SDF switch elements 112 and 116 to add in failsafe redundancy for non-intended fabric connections, and 2) to provide additional signal integrity conditioning aiding in routing high speed LVDS signals though multiple connectors. This conservative approach may ensure the SDF switch 110 is configurable as a removable form factor element within the LRU. The SDF status and control 114 may command the quad equalizer 324 to an on/off status via a quad control bus 346.

As system 100 may connect processing resources by PCIe, this connection may offer a significant improvement in bandwidth and latency over traditional Ethernet interconnection. Hardware layers of PCIe may be essentially transparent to software as a physical layer and instead may appear as a memory window into other devices (endpoints) on the fabric. Using PCIe as the fabric has the added benefit of a growth path to being able to extend Symmetric Multi-Processing (SMP) beyond multicore on a blade to multi-blade SMP Preferably, the SDF switch 110 may achieve a multi-level security or multi-security level architecture in a single LRU by maintaining security separation among enclaves via separation of enclave fabrics. The system 100 may enhance SDF functionality by allowing fabric to be configured by firmware revision or dynamically by operational field program thereby eliminating the need to pass high bandwidth data through a guard.

In one embodiment, the first physical switch 320 and the second physical switch 322 may include a LVDS COTS A-B switch that may be used to switch either PCIe fabric or thin pipe Ethernet. As the system 100 is scalable, multiple switches may be cascaded to increase the number of LVDS lanes or fabrics able to connect. In general, on power-up, the TS GPP 130 root device may enumerate the bus. This means that fabric configuration may occur at boot or in the case of an OFP configured fabric, a method to delay power-on sequencing may be required.

Figure 4:
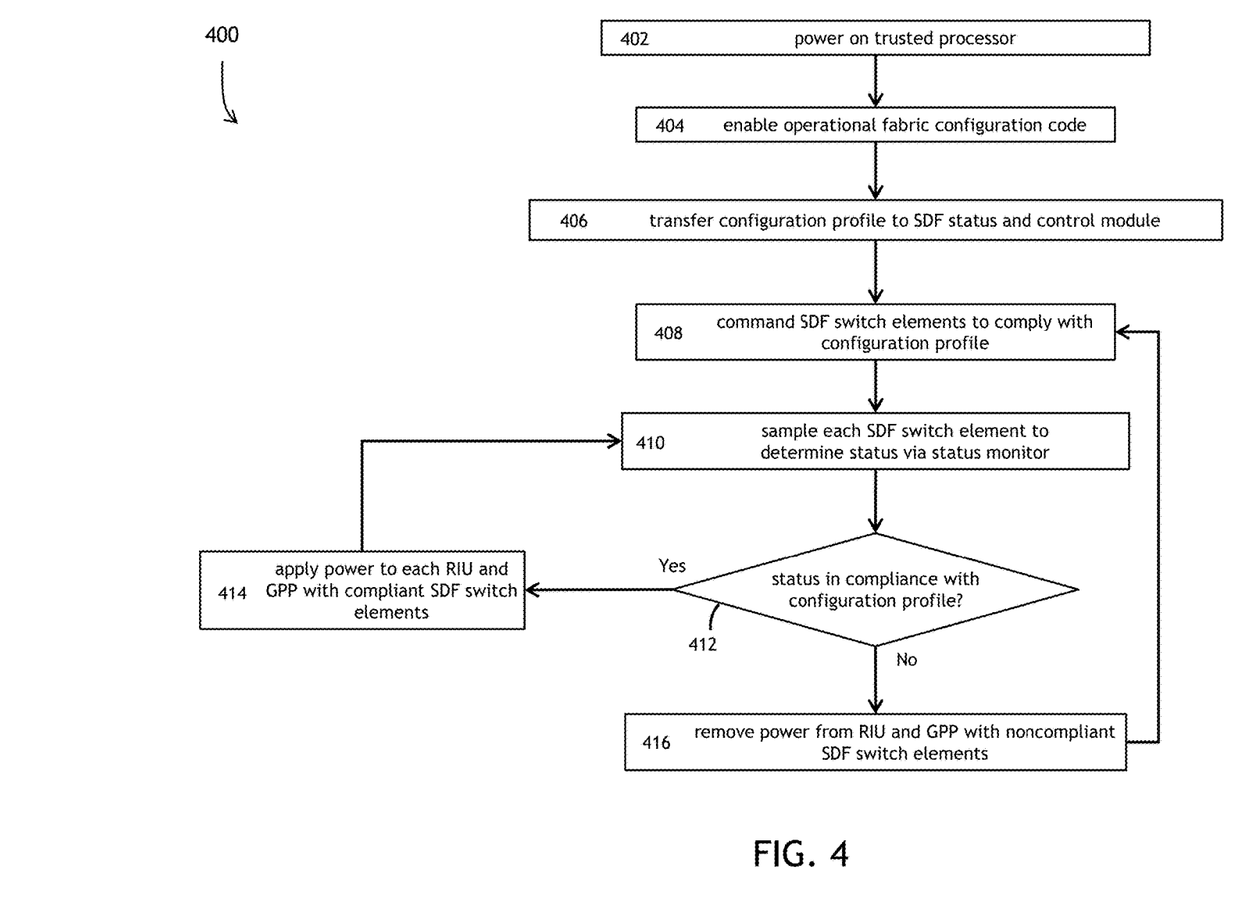
FIG. 4 is a flowchart for a method for securely switching a deterministic fabric exemplary of one embodiment of the inventive concepts disclosed herein.

Referring to FIG. 4, a flowchart for a method for securely switching a deterministic fabric exemplary of one embodiment of the inventive concepts disclosed herein is shown. The method 400 may, at a step 402, apply power to a trusted processor, and at a step 404, enable an operational fabric configuration code to operate within the trusted processor. The method 400 may, at a step 406, transfer configuration profile to the SDF status and control module, and at a step 408, command each SDF switch element to comply with the configuration profile. The method 400 may, at a step 410, sample each SDF switch element for status in compliance with the configuration profile, and at a step 412, the method 400 may query if the status of each SDF switch element is within compliance with the configuration profile. Should the answer to query 412 be positive, the method may, at a step 414 apply power to each of the RIU and GPP associated with the compliant SDF switch elements. However, should the answer to query 412 be negative, the method may, at a step 416, remove power from the RIU and GPP associated with the noncompliant SDF switch elements. Further, the method 400 may continuously monitor each of the SDF switch elements to ensure continued compliance with the configuration profile.

In embodiments, the method 400 may employ several variations on fabric configuration sequencing. In one embodiment, a single trusted configuration file for each SDF switch element may be stored in a non-volatile memory. The SDF status and control module may be positioned in-line between the non-volatile memory and each SDF switch element. On power-up, the SDF status and control module would manage access to indexed configuration files in nonvolatile memory and power-on sequencing of the programmable SDF switch elements. An additional embodiment may include multiple trusted configurations stored in the nonvolatile memory and the fabric may be configured by look-up indexed configuration files determined by discrete 10 settings.

Figure 5:
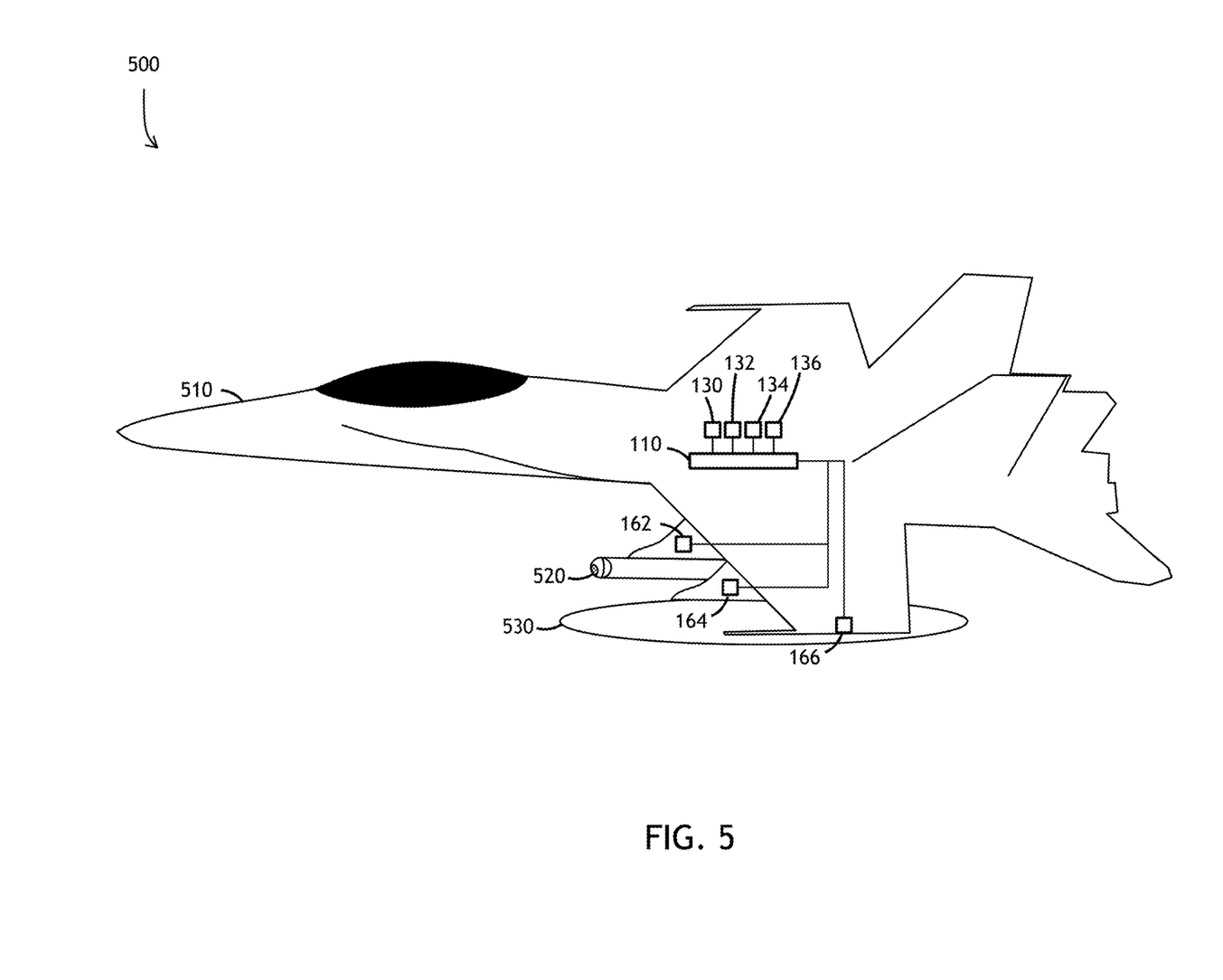
FIG. 5 is a diagram of an exemplary implementation of one embodiment of the inventive concepts disclosed herein.

Referring to FIG. 5, a detailed diagram of a SDF switch element exemplary of an embodiment of the inventive concepts disclosed herein is shown. The implementation 500 of system 100 may be deployed onboard a fighter aircraft 510. Each RIU 162 164 and 166 may be installed on an associated weapons station and operatively coupled with the SDF switch 110. GPP 130-136 may also be operatively coupled with the SDF switch 110 and able to support each processing requirement of an exemplary TS sensor 520 via the TS COTS fabric 124 as well as an installed SBU fuel tank 530 via the SBU COTS fabric 120.

CONCLUSION

Specific blocks, sections, devices, functions, processes and modules may have been set forth. However, a skilled technologist will realize that there are many ways to partition the system, and that there are many parts, components, processes, modules or functions that may be substituted for those listed above.

Skilled artisans will recognize that the state of the art has progressed to the point where there may be little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs.

Additionally, implementations of embodiments disclosed herein may include executing a special-purpose instruction sequence or invoking circuitry for enabling, triggering, coordinating, requesting, or otherwise causing one or more occurrences of virtually any functional operations described herein.

While particular aspects of the inventive concepts disclosed herein have been shown and described, it will be apparent to those skilled in the art that, based upon the teachings herein, changes and modifications may be made without departing from the inventive concepts described herein and their broader aspects and, therefore, the appended claims are to encompass within their scope all such changes and modifications as are within the true spirit and scope of the subject matter described herein.

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently.

What is claimed is:

1. A method for secure deterministic fabric switching, comprising:
    applying power to a trusted general purpose processor (GPP), the trusted GPP one of a plurality of GPP;
    enabling an operational fabric configuration code within the trusted GPP;
    transferring a secure deterministic fabric (SDF) configuration profile from the trusted GPP to a SDF status and control module, the SDF configuration profile based on the operational fabric configuration code;
    commanding, via a control element associated with the SDF status and control module, a position of at least one SDF switch element in compliance with the SDF configuration profile, the position of the at least one SDF switch element coupling at least one of the plurality of GPP and at least one remote interface unit (RIU) with one of a first security level fabric or at least one second security level fabric;
    sampling, via a status monitor associated with the SDF status and control module, a status of each of the at least one SDF switch element;
    determining via the status monitor whether the status of each one of the at least one SDF switch element is in compliance with the SDF configuration profile;
    applying power, via a power enable (PE) control system associated with the SDF status and control module, to a specific one of the at least one RIU and a specific one of the at least one GPP in response to determining that the status associated with a SDF switch element coupled with the specific one of the at least one RIU and the specific one of at least one GPP is in compliance with the SDF configuration profile with the SDF switch element configuration; and
    removing power via the PE control system from a specific one of the at least one RIU and a specific one of the at least one GPP in response to determining that the status associated with a SDF switch element coupled with the specific one of the at least one RIU and the specific one of at least one GPP is not in compliance with the SDF configuration profile with the SDF switch element configuration.

2. The method for secure deterministic fabric switching of claim 1, wherein the at least one SDF switch element further comprises a first switch element comprising at least two positions coupled with a second switch element comprising an on off switch, the first switch element further including a common switch position.

3. The method for secure deterministic fabric switching of claim 1, wherein the first security level fabric is restricted to an unclassified level of security and the at least one second security level fabric is restricted to one of: a secret level of security, a top secret level of security, a sensitive but unclassified level of security, and a secret no foreign level of security.

4. The method for secure deterministic fabric switching of claim 1, wherein the RIU is at least one of: a remote interface unit associated with a weapons station, an additional processing resource requiring GPP processing capability, and a switched Ethernet system.

5. The method for secure deterministic fabric switching of claim 1, wherein commanding a position of the at least one SDF switch element further comprises a SDF switch element command prior to a GPP power cycle and a constant SDF switch element position during the power cycle.

6. The method for secure deterministic fabric switching of claim 1, wherein commanding a position of the at least one SDF switch element further comprises a dynamic repurposing of at least one GPP, the dynamic repurposing including a dynamic SDF switch element command in response to a change in RIU requirements, the dynamic SDF switch element command causing the SDF status and control module to perform and direct the steps of:
   selecting at least one of the plurality of GPP for dynamic repurposing;
   removing power via the PE control system from the selected GPP;
   commanding via the control element the position of the at least one SDF switch element coupled with the selected GPP, the commanding in compliance with the dynamic SDF switch element command;
   sampling via the status monitor the status of each of the at least one SDF switch element;
   determining via the status monitor if the status of each one of the at least one SDF switch element is in compliance with the dynamic SDF switch element command;
   applying power via the PE control system to the selected GPP if the status associated with the at least one SDF switch element coupled with the selected GPP is in compliance with the dynamic SDF switch element command.

7. The method for secure deterministic fabric switching of claim 1, wherein the at least one SDF switch element configuration profile is limited by number, time, mission duration, and includes at least one prohibited SDF switch element configuration.

8. The method for secure deterministic fabric switching of claim 1, wherein the status monitor further includes at least two additional status monitoring elements to provide a triple redundancy to the monitoring function of each of the at least one SDF switch element.

9. The method for secure deterministic fabric switching of claim 1, wherein the SDF status and control module is a field programmable gate array which is configurable by the trusted one of the at least one GPP.

10. The method for secure deterministic fabric switching of claim 1, wherein each of the SDF switch elements is couplable to a GPP and a RIU via a peripheral component interface express architecture.

11. A system for secure deterministic fabric switching, comprising:
   at least one secure deterministic fabric (SDF) switch element connectable with at least one Remote Interface Unit (RIU) and connectable with at least one general purpose processor (GPP);
   a first security level fabric;
   at least one second security level fabric;
   the at least one SDF switch element configured for operationally coupling at least one RIU with one of the first security level fabric or the at least one second security level fabric;
   the at least one SDF switch element further configured for operationally coupling at least one GPP with one of the first security level fabric or the at least one second security level fabric;
   a SDF status and control module including:
      a control element coupled with each of the at least one SDF switch element and configured for commanding a position of each of the at least one SDF switch element;
      a status monitor coupled with each of the at least one SDF switch element and configured for monitoring a status of each of the at least one SDF switch element; and
      a power enable (PE) control system coupled with the at least one RIU and the at least one GPP and configured for supplying and removing power from the at least one RIU and the at least one GPP;
   the SDF status and control module configured for receiving a SDF configuration profile from a trusted GPP, the SDF configuration profile including at least one SDF switch element configuration;
   the SDF status and control module further configured for controlling the control element, the status monitor and the PE control system including:
      commanding via the control element the position of the at least one SDF switch element in compliance with the SDF switch element configuration;
      sampling via the status monitor the status of each of the at least one SDF switch element;
      determining via the status monitor whether the status of each one of the at least one SDF switch element is in compliance with the SDF switch element configuration;
      applying power via the PE control system to a specific one of the at least one RIU and the at least one GPP in response to determining that the status associated with a SDF switch element coupled with the specific one of the at least one RIU and the at least one GPP is in compliance with the SDF switch element configuration; and
      removing power via the PE control system from a specific one of the at least one RIU and from a specific one of the at least one GPP in response to determining that the status associated with a SDF switch element coupled with the specific one of the at least one RIU and the at least one GPP is not in compliance with the SDF switch element configuration.

12. The system for secure deterministic fabric switching of claim 11, wherein the at least one SDF switch element further comprises a first switch element comprising at least two positions coupled with a second switch element comprising an on off switch, the first switch element further including a common switch position.

13. The system for secure deterministic fabric switching of claim 11, wherein the first security level fabric is restricted to an unclassified level of security and the at least one second security level fabric is restricted to one of: a secret level of security, a top secret level of security, a sensitive but unclassified level of security, and a secret no foreign level of security.

14. The system for secure deterministic fabric switching of claim 11, wherein the trusted one of the at least one GPP is restricted to a highest security level available to each of the at least one GPP.

15. The system for secure deterministic fabric switching of claim 11, wherein commanding a position of the at least one SDF switch element further comprises a SDF switch element command prior to a GPP power cycle and a constant SDF switch element position during the power cycle.

16. The system for secure deterministic fabric switching of claim 11, wherein commanding a position of the at least one SDF switch element further comprises a dynamic repurposing of at least one GPP, the dynamic repurposing including a dynamic SDF switch element command in response to a change in RIU requirements, the dynamic SDF switch element command causing the SDF status and control module to perform and direct the steps of:
- selecting at least one GPP for dynamic repurposing;
- removing power via the PE control system from the selected GPP;
- commanding via the control element the position of the at least one SDF switch element coupled with the selected GPP, the commanding in compliance with the dynamic SDF switch element command;
- sampling via the status monitor the status of each of the at least one SDF switch element;
- determining via the status monitor if the status of each one of the at least one SDF switch element is in compliance with the dynamic SDF switch element command;
- applying power via the PE control system to the selected GPP if the status associated with the at least one SDF switch element coupled with the selected GPP is in compliance with the dynamic SDF switch element command.

17. The system for secure deterministic fabric switching of claim 11, wherein the at least one SDF switch element configuration is limited by number, time, mission duration, and includes at least one prohibited SDF switch element configuration.

18. The system for secure deterministic fabric switching of claim 11, wherein the status monitor further includes at least two additional status monitoring elements to provide a triple redundancy to the monitoring function of each of the at least one SDF switch element.

19. The system for secure deterministic fabric switching of claim 11, wherein the SDF status and control module is a field programmable gate array which is configurable by the trusted one of the at least one GPP.

20. The system for secure deterministic fabric switching of claim 11, wherein each of the SDF switch elements is couplable to a GPP and a RIU via a peripheral component interface express architecture.

* * * * *